Patented Apr. 10, 1934

1,954,397

UNITED STATES PATENT OFFICE 1,954,397

DEPILATORY

Albert A. Uebbing, Chicago, Ill., assignor to The Delatone Company, Chicago, Ill., a corporation of Illinois No Drawing. Application April 15, 1932, Serial No. 605,556

7 Claims. (Cl. 167—89)

The present invention relates to depilatories, and has particular reference to improvements by which the use of depilatories is made more desirable.

Depilatories are ordinarily composed of a depilating agent such as a sulfide of barium, strontium, or calcium, to which is added an insoluble diluent and a sufficient quantity of water to render the depilatory of a pasty consistency. Talc, calcium carbonate, magnesium oxide, and other similar diluents have been used, but in such cases the depilatory tends to become discolored and to develop a disagreeable odor, indicating a chemical reaction.

A primary object of the present invention is to provide a depilatory of permanent white color.

An additional object is to provide a paste depilatory free from constituents tending to cause discoloration and disagreeable odors.

A further object is the provision of a paste depilatory effective for the purpose for which it is intended and of particularly desirable spreading qualities.

One of the causes of discoloration in paste depilatories is the presence of iron in materials used in production of the depilatory, the iron combining with the sulfide depilating agent to form dark colored sulfide of iron, thereby making it impossible to produce the desired pure white product.

By employing products having as small a content of iron as possible, the formation of iron sulfide is minimized, thereby producing a relatively light-colored paste. Iron, however, is almost universally present in both natural and commercially purified mineral products of the type suitable for use as the solid inert component or diluent of depilatory paste. The production of a pure white paste made by exclusion of iron from the product is therefore extremely difficult and relatively expensive.

An additional cause of discoloration of paste depilatories is the yellow or gray color of the alkaline earth sulfides which are used as depilants, and which consequently are essential ingredients of depilatories.

In accordance with my invention, a white depilatory paste is produced by the use of an inert diluent from a class of products which heretofore have not been used in depilatories. The class of products that I have found especially suitable for the purpose described is the white paint pigments which are not discolored by the sulfides. Of the members of this class zinc sulfide, lithopone and titanium oxide or titanox are particularly desirable. Depilatory pastes containing these materials as the inert diluent are permanently white and relatively free from unpleasant odor. Their intense whiteness and great hiding power obliterate or mask the gray or yellow color of the relatively small amount of the gray or yellow sulfide which is used as the depilating agent, and since these pigments are not discolored by sulfidic agents, they do not undergo discoloration when brought into intimate contact with the sulfide depilant.

The pigment diluents are mixed with the depilating agent and a sufficient quantity of liquid, such as water, to render the depilatory of the desired degree of plasticity. A different amount of water will be required in each instance to produce a paste of a given plasticity, due to the difference in the nature of the various pigments.

Paste depilatories containing white pigments may be smoothly and easily spread over the parts from which hair is to be removed, and after the desired result has been accomplished, the depilatory is easily removed in the usual manner.

To produce a satisfactory depilatory paste, 5 parts of barium sulfide may be mixed with 63 parts of lithopone. The materials are thoroughly mixed while dry, and then slowly added to 48 parts of a 5 per cent soap solution.

When it is desired to employ zinc sulfide as the white pigment, 63 parts of the zinc sulfide are mixed with 5 parts of barium sulfide. This mixture is added to 32 parts of a 5 per cent soap solution and thoroughly mixed therewith.

The material titanox, which consists of barium sulfate containing a relatively large amount of titanium oxide is mixed with barium sulfide in proportions similar to those specified in the foregoing examples, and the mixture is added to 35 parts of a 5 per cent soap solution and mixed therewith.

It will be understood that the examples given heretofore are for purposes of illustration and explanation. For example, the proportions of the materials may be varied to some extent. Also, a mixture of the pigments may be employed. These and other modifications coming within the spirit of my invention are intended to be included in the appended claims.

I claim:

1. A depilatory, containing a depilating agent and an inert white pigment from the group comprising zinc sulfide, lithopone, and titanium oxide.

2. A depilatory, containing a sulfide depilating agent, a white pigment from the group comprising zinc sulfide, lithopone, and titanium oxide, and a sufficient quantity of an inert liquid to render said depilatory of a pasty consistency.

3. A depilatory, containing barium sulfide, a white pigment from the group comprising zinc sulfide, lithopone, and titanium oxide, and a sufficient quantity of soap solution to render said depilatory of pasty consistency.

4. A depilatory, containing barium sulfide, and a white pigment from the group comprising zinc sulfide, lithopone, and titanium oxide.

5. A depilatory, containing substantially 5 parts of barium sulfide, 63 parts of a white pigment from the group comprising zinc sulfide, lithopone, and titanium oxide.

6. A depilatory, comprising substantially 5 parts of barium sulfide, 32 parts of a white pigment from the group comprising zinc sulfide, lithopone, and titanium oxide, and a sufficient quantity of soap solution to render said depilatory of pasty consistency.

7. A process for making a depilatory, which comprises mixing substantially 5 parts of barium sulfide with substantially 63 parts of a white pigment from the group comprising zinc sulfide, lithopone, and titanium oxide, and mixing therewith a sufficient quantity of a soap solution to render said depilatory of a pasty consistency.

ALBERT A. UEBBING.